Q. S. BACKUS.
Bit-Stock.

No. 204,416.  Patented June 4, 1878.

Attest:
F. H. Schott
Fred E. Tasker

Inventor:
Quimby S. Backus
by J. C. Tasker & Co.
attys.

UNITED STATES PATENT OFFICE.

QUIMBY S. BACKUS, OF HOLYOKE, MASSACHUSETTS.

IMPROVEMENT IN BIT-STOCKS.

Specification forming part of Letters Patent No. 204,416, dated June 4, 1878; application filed November 21, 1877.

*To all whom it may concern:*

Be it known that I, QUIMBY S. BACKUS, of Holyoke, in the county of Hampden and State of Massachusetts, have invented certain new and useful Improvements in Bit-Braces; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to produce a bit brace or stock that shall be simple in construction, avoiding all the complicated devices for holding the bit which are applied to the best braces now in use, and at the same time preserving the efficiency of the implement in the highest degree, causing it to possess great durability, and reducing its cost to such an extent as to allow an excellent tool to be manufactured and sold at the price of an ordinary article.

The invention consists in forming the jaws which contain the bit-socket, as well as a portion of the shank of the brace to which they are connected, in two corresponding elastic parts, which, in their normal condition, separate, but are caused to approach each other and securely hold the bit or other tool placed between them in the socket of the jaws by means of an internally-threaded sleeve acting upon the conical extremity of the jaws of the bit-holder, and upon a conical screw-threaded portion of the same surrounding the bit-socket, so as to cause the jaws to approach each other in nearly parallel lines, as will be hereinafter fully described, and then specifically pointed out in the claims.

Figure 1:
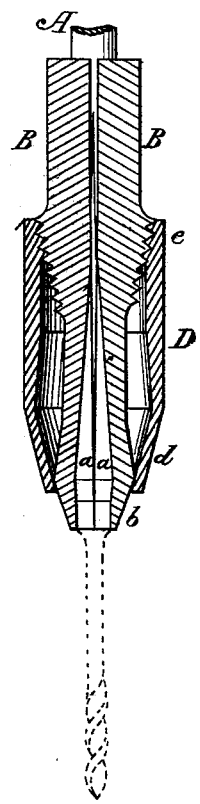
Figure 2:
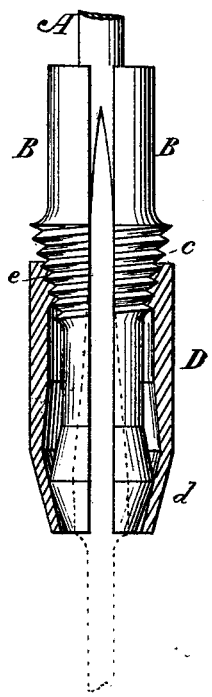
Figure 3:
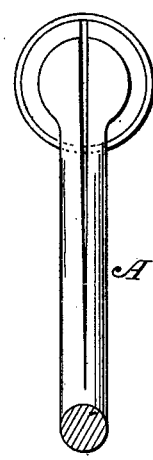
Figure 4:
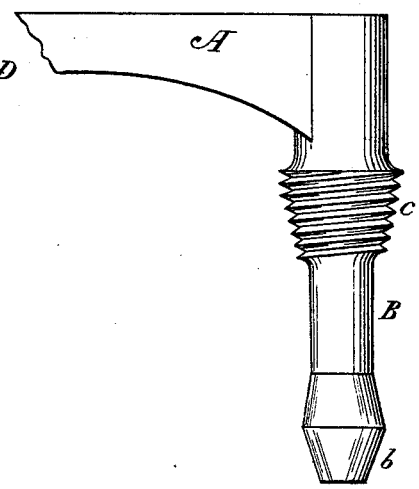

In the accompanying drawings, Figure 1 is a vertical section through the jaws and sleeve, showing these parts in the position they occupy when the jaws are closed upon the shank of a bit, which is indicated by that part of the figure in dotted lines. Fig. 2 shows the same parts, the sleeve alone being in section, the jaws being expanded to receive a bit or other tool. Fig. 3 is a top view of the bit-holder and sleeve, with a portion of the shank attached, showing the manner in which the latter is split or divided; and Fig. 4 presents a side view of the bit-holder and portion of the shank with the sleeve removed, so as to clearly show the relative position of the conical parts of the jaws of the bit-holder.

The body of the brace may be constructed of wrought or malleable iron or steel in the manner so well known in the arts as to require no specific description; but its lower shank A, together with the tool-holding jaws, are separated, split, or slotted, so as to form two corresponding parts, B B, which are so tempered as to possess the resilient properties of springs, which spread apart, when not compressed, to such a distance as to allow the shank of a tool to enter the socket formed by the angular cavities $a\ a$ in the jaws.

The exterior portions of the jaws are semi-conical at $b$ and $c$, $b$ having a smooth exterior; but the portion $c$ is provided with a screw-thread cut in its surface, when the jaws are compressed, so as to nearly or quite touch each other, thus causing it to have a circular section when the jaws are closed together, but elliptical when they are expanded. The cone $b$ is also formed under the same circumstances, and changes its sectional contour in the same manner. A sleeve, D, having its lower end contracted so as to form the cone $d$, and its upper end expanded and provided with the internal screw-thread $e$, is placed over the jaws B, its screw $e$ engaging with the screw-thread upon the conical portion $c$, in such manner that when it is turned in one direction it shall advance upon the jaws, and, by its action upon the conical threaded portions $b$ and $c$, compress them, causing the jaws to grasp and securely hold the shank of any tool placed in the socket between them, but when turned in the opposite direction will allow the jaws to expand, releasing the tool from their grasp.

Bit-braces have been constructed with the split shank, the method of securing the bit in them being generally by means of a pair of independent jaws attached to the shank, or by a thumb-screw connecting them, when the jaws formed a continuation of the shank; but these methods were objectionable, the first on account of its complication of devices, and the last owing to its lack of durability, the thumb-screw soon becoming so worn as to be inoperative, as well as that its pressure upon the tool-shank was not equalized, but wholly confined to the upper end of the socket.

By my method all these evils are obviated, the sleeve exerting its pressure at both ends of the tool-socket, and the arrangement of the screw-threaded cones being such as to obviate all danger of the implements becoming useless from wear.

Having thus described my invention, I claim as new, and desire to secure by Letters Patent of the United States, the following:

1. In a bit-brace or tool-holder, the spring tool-holding jaws having the two conical projections, one of which is provided with a screw-thread, for the purpose of producing an equal compression of the jaws throughout their length, as set forth.

2. In a bit-brace or tool-holder, the spring tool-holding jaws, which are semi-conical in form for a part or the whole of their length, and are provided with an exterior screw-thread, in combination with the internally screw-threaded sleeve, substantially as described.

In testimony that I claim the foregoing as my own I hereunto affix my signature in presence of two witnesses.

QUIMBY S. BACKUS.

Witnesses:
J. P. BUCKLAND,
WM. G. WHITE.